United States Patent [19]

Asai et al.

[11] Patent Number: 4,678,682

[45] Date of Patent: Jul. 7, 1987

[54] PROCESS FOR PRODUCING MAGNETIC RECORDING MEDIUM

[75] Inventors: Takamitsu Asai; Goro Akashi; Tatsuji Kitamoto; Hiroshi Chikamasa; Tsunehiko Sato, all of Kanagawa, Japan

[73] Assignee: Fuji Photo Film Co., Ltd., Kanagawa, Japan

[21] Appl. No.: 496,734

[22] Filed: May 20, 1983

[30] Foreign Application Priority Data

May 20, 1982 [JP] Japan .................................. 57-84063
May 21, 1982 [JP] Japan .................................. 57-84919

[51] Int. Cl.⁴ .............................................. B05D 3/14
[52] U.S. Cl. ..................................... 427/48; 427/128; 427/130
[58] Field of Search ........................... 427/48, 127–132

[56] References Cited

U.S. PATENT DOCUMENTS 3,117,065 1/1964 Wootten ................................ 204/20

FOREIGN PATENT DOCUMENTS 1416200 12/1975 United Kingdom .

Primary Examiner—Bernard D. Pianalto
Attorney, Agent, or Firm—Sughrue, Mion, Zinn, Macpeak & Seas

[57] ABSTRACT

The perpendicular magnetic orientation of a magnetic layer containing platelet-form ferromagnetic particles coated on a web support is effectively performed by passing a web having thereon the coated magnetic layer in an undried state through a magnetic field formed by plural pairs of opposite pole type magnets disposed in the travelling direction of the web with a gap between adjacent pairs of magnets, while supplying drying air through each gap onto the surface of the travelling web to substantially complete the drying of the coated layer while the web is in the magnetic field. A partition may be inserted in each gap so that the lower end of the partition is close to the upper surface of the travelling web to divide the gap into a front section and a back section, and the drying air may be passed through these sections.

3 Claims, 5 Drawing Figures

//4,678,682//

PROCESS FOR PRODUCING MAGNETIC RECORDING MEDIUM

FIELD OF THE INVENTION

This invention relates to a process of producing a magnetic recording medium, and more particularly to a process of producing a magnetic recording medium having a perpendicularly oriented magnetic layer coated on a nonmagnetizable support. More specifically, the invention relates to an improved orientation process for producing a perpendicularly oriented magnetic recording medium.

BACKGROUND OF THE INVENTION

A magnetic recording medium of the type produced by the process of this invention comprises a nonmagnetizable support having coated thereon a layer of a magnetic coating composition composed of a ferromagnetic material and a nonmagnetizable binder, said ferromagnetic material comprising platelet-form ferromagnetic particles having the axis of easy magnetization perpendicular to the plane of the platelet-form particle. As such ferromagnetic materials, there are known, for example, barium ferrite; barium ferrite having a part of the barium and/or iron substituted by other metals such as calcuim, strontium, lead, cobalt, nickel, etc.; MnBi; and MnBi having the manganese or bismuth thereof substituted by selenium or other metals.

In the production of such a magnetic recording medium, a process is usually employed wherein, after coating a magnetic coating composition on a nonmagnetic support, the magnetic particles in the coated layer are oriented to the recording direction in a magnetic field before drying the magnetic layer to improve the magnetic conversion characteristics for that direction; such an orientation process is already known for acicular $\gamma$-$Fe_2O_3$, etc., which is used for ordinary magnetic recording tapes and has been practically used. Examples of the orientation technique are described in, for example, Japanese Patent Publication Nos. 5350/1965; 23,624/1965; 23,626/1965; 2065/1966 and 21,251/1968.

In the present invention, it is intended to improve upon the process described in Japanese Patent Publication No. 856/1981 for providing a magnetic recording medium suitable for magnetic recording utilizaing the perpendicularly magnetizable component of platelet-form ferromagnetic particles having a magnetic anisotropy in the direction perpendicular to the plane of the ferromagnetic particle by magnetically orienting the axis of easy magnetization of the platelet-form ferromagnetic particles in the direction perpendicular to the support of the magnetic recording medium.

As described in "Nikkei Electronics", pages 100-111, Aug. 7, 1978 and "IEEE Transation of Magnetics"; Vol. MAG-15, No. 6, 1561-1563 (Nov., 1979), perpendicular magnetic recording is excellent for high-recording density magnetic recording.

As processes for orienting magnetic particles in a magnetic field in the direction perpendicular to the support surface of a magnetic recording medium, there are presently proposed a process of increasing the intensity of the magnetic field perpendicular to a web surface carrying the magnetic layer coated thereon (Japanese Patent Application (OPI) No. 58,246/1982), and a process of substantially finishing drying of the coated magnetic layer in a strong magnetic field (Japanese Patent Application (OPI) No. 58,241/1982). For producing a coating-type perpendicularly magnetized magnetic recording medium, a coating composition prepared by dispersing ferromagnetic particles having platlet form and having the axis of easy magnetization in the direction perpendicular to the plane of the platelet-form ferromagnetic particles in a nonmagnetizable binder is coated on a web support, and a magnetic field is applied to the web in the direction perpendicular to the web surface to perform the magnetic orientation treatment to align the axes of easy magnetization of the foregoing platelet-form magnetic particles perpendicular to the web surface. In this case, it is preferred to dry the coated magnetic layer in a strong magnetic field applied in the direction perpendicular to the web surface in the foregoing known processes.

However, in the case of industrially performing the foregoing orientation process while continuously transporting a web having a coated magnetic layer thereon, the section of strong field application must be greatly prolonged to substantially finish drying the coated magnetic layer within the magnetic field.

SUMMARY OF THE INVENTION

A first object of this invention is to provide a novel process of effectively drying a magnetic layer coated on a web support continuously travelling in a strong magnetic field, to produce a magnetic recording medium.

A second object of this invention is to provide a process of producing a magnetic recording medium having a magnetic layer containing platelet-form ferromagnetic particles magnetically oriented in the direction perpendicular to the web surface of the magnetic recording medium.

A further object of this invention is to provide a novel and effective process for magnetically orienting a magnetic coating composition containing platelet-form ferromagnetic particles coated on a web support in the direction perpendicular to the web surface while finishing the drying of the coated magnetic layer during orientation, to produce an improved magnetic recording medium.

As the result of various investigations having the object of finding an effective process of producing a magnetic recording medium capable of magnetically orienting a magnetic layer containing platelet-form ferromagnetic particles coated on a web support in the direction perpendicular to the web support while drying the coated magnetic layer in the magnetic field, the inventors have discovered that the foregoing objects of the invention can be attained by the process of this invention as set forth below.

That is, according to a first embodiment of this invention, there is provided a process of producing a magnetic recording medium by drying a continuously travelling web support having a magnetic layer containing platelet-form magnetic particles in an undried state coated on a nonmagnetizable web support in a magnetic field perpendicular to the web support, which comprises passing the web support through the magnetic field formed perpendicularly to the web support by plural pairs of opposite pole type magnets disposed in the travelling direction of the web with proper gaps between the pairs of magnets, while supplying drying air onto the coated magnetic layer of the travelling web through each gap, to perform magnetic orientation of the magnetic layer perpendicular to the web surface and substantially complete the drying of the magnetic layer while the web is within the magnetic field.

According to a second embodiment of this invention, there is also provided a process of producing a magnetic recording medium as set forth above wherein a partition is inserted in each gap between the magnets disposed above the travelling web so that the lower end of the partition is close to the upper surface of the travelling web, to divide the gap into a front section and a back section, and the drying air is separately passed through the front section and the back section of each gap.

DETAILED DESCRIPTION OF THE PREFERRED EMBODIMENTS

The invention will now be explained in detail with reference to the accompanying drawings.

Figure 1:
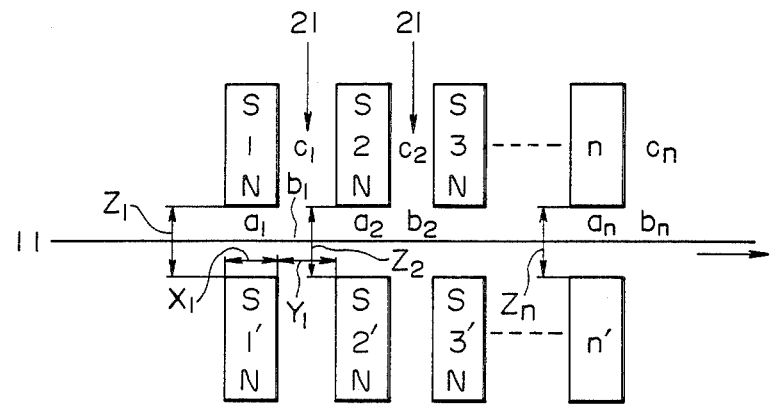
FIG. 1 is a schematic view showing a first embodiment of the process of this invention.

FIG. 1 is a schematic view showing the process according to the first embodiment of this invention. Plural pairs of opposite pole type magnets $1, 1'; 2, 2'; \ldots n, n'$ are disposed in the travelling direction of a web 11 with proper gaps $c_1, c_2, \ldots c_n$ therebetween. A web 11 having coated thereon a magnetic composition composed of platelet-form ferromagnetic particles dispersed in a nonmagnetizable binder in an undried state is continuously passed in the direction indicated by the arrow through the strong magnetic field formed in the gaps $a_1, a_2, \ldots n$ and $b_1, b_2, \ldots bn$ between each pair of opposite pole type magnets 1 and 1'; 2 and 2'; etc. In this case, drying air 12 is supplied through the gaps $c_1, c_2, \ldots c_{n-1}$ each formed between the pairs of opposite pole type magnets, onto the upper surface of the continuously travelling web having the magnetic layer coated thereon to dry the magnetic layer.

By employing the foregoing construction according to the first embodiment of this invention, the platelet-form ferromagnetic particles in the magnetic layer formed on the web can be magnetically oriented in the direction perpendicular to the web surface, and the magnetic layer can also be completely dried while the web is within the magnetic field, whereby an improved magnetic recording medium can be obtained.

The magnets $1, 1'; 2, 2'; \ldots n, n'$, used in this invention may be formed by electromagnets, coreless solenoids, or permanent magnets such as ALNICO, a cobalt-rare earth magnet, etc.

The intensity of the magnetic field employed in this invention is usually higher than the coercive force of the ferromagnetic particles used in this invention, and is preferably higher than three times the coercive force thereof. When performing the perpendicular magnetization or orientation of a coated magnetic layer on a continously travelling web, the intensity of the magnetic field required for the orientation is generally higher than that in the case of ordinary magnetization or magnetic orientation in the longitudinal direction of a web owing to a large demagnetization field occuring in the coated magnetic layer. When ferromagnetic particles having, for example, a coercive force of 800 to 1,000 oersteds (Oe) are used, a magnetic field higher than 1,000 Oe, and preferably 3,000 to 5,000 Oe is used in this invention.

The intensity of the magnetic field in the gaps $a_1, a_2, \ldots a_n$ between each pair of magnets 1 and 1'; 2 and 2'; etc., can generally be increased as the distance $Z_1, Z_2, \ldots Z_n$ between the pair of magnets is narrowed. As to the magnetic field near the magnets 1 and 1'; and 2 and 2', if the distance $Z_1$ between a pair of opposite pole type magnets 1 and 1' is increased beyond the point where this distance is the same as the length $X_1$ of the magnet 1 or 1' in the travelling direction of the web, the intensity of the magnetic field at the portion $a_1$ rapidly decreases. Also, in contrast, if the distance $Y_1$ between the magnets 1' and 2' is increased above where the distance $Y_1$ is the same as the distance $Z_1$, the intensity of the magnetic field at the portion $b_1$ between the pairs of magnets 1, 1' and 2, 2' begins to decrease rapidly. Therefore, a disposition of the magnets such that $X_1$, $Y_1$, and $Z_1$ are almost the same is most effective. However, if the intensity or magnetic force of the magnets employed is sufficiently large as compared to the intensity of the magnet field required to perform orientation, $X_1$, $Y_1$, and $Z_1$ may, as a matter of course, be other than as described above.

By employing a disposition of the magnets as described above, spaces $a_1$ and $b_1$ having a sufficiently high intensity of magnetic field can be formed, and drying air for drying the coated magnetic layer on the continuously travelling web support can be supplied to the surface of the web utilizing the gap $c_1$ located above the gap $b_1$.

In a given pair of magnets, the length X in the travelling direction of the web, the quality of material, and the form of the upper magnet are fundamentally the same as the like qualities of the lower magnet. However, the length $X_i$ of one pair of magnets may, as the case may be, differ from the length $X_{i+1}$ of the pair of magnets adjacent thereto. If the magnet is formed by laminating permanent magnet plates, the length $X_i$ may be changed by properly selecting the number of the magnet plates, and if the magnet is formed by an electromagnet, electromagnets having a desired length $X_i$ may be selectively used.

In this invention, plural pairs (more than two pairs) of magnets are necessary and the number of pairs of magnets is properly selected according to the travelling speed of web, the intensity of the magnetic field, the drying period, etc.

Figure 4:
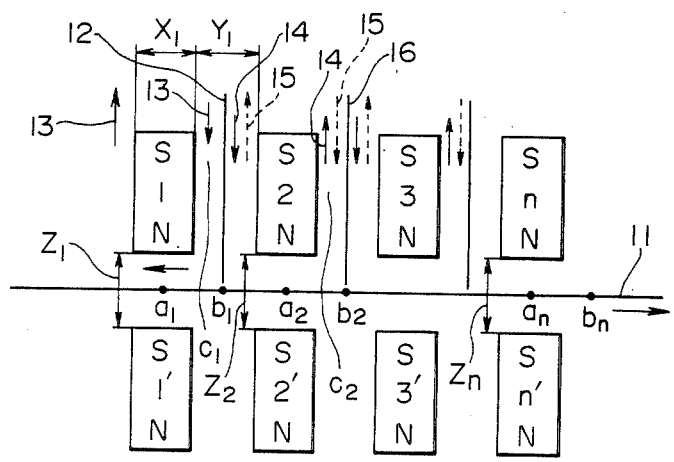
FIG. 4 is a schematic view showing the principles of the second embodiment of the process of this invention.

FIG. 4 is a schematic view explaining the principles of a process according to the second embodiment of this invention. Plural pairs of opposite pole type magnets $1, 1'; 2, 2'; \ldots n, n'$ with proper gaps $c_1, c_2, \ldots c_n$ are disposed in the travelling direction of a web 11 (indicated by the arrow) and the web is continuously passed. The web 11 has a coated magnetic layer containing platelet-form ferromagnetic particles in an undried state, and is moved through the magnetic field formed in the gaps $a_1, a_2, \ldots a_n$ and $b_1, b_2, \ldots b_n$ between each pair of magnets while drying air is supplied onto the upper surface thereof through the gaps $c_1, c_2, \ldots c_{n-1}$ to magnetically orient the ferromagnetic particles in the direction perpendicular to the web surface and dry the coated layer while the web is in the magnetic field. A partition 12 is inserted into the gap or space $c_1$ between the magnets 1 and 2 disposed above the travelling web 11 so that the lower end of the partition 12 is close to the upper surface of the web 11, to divide the gap $c_1$ into a front section and a back section. Drying air 13 is supplied through the back section thus formed between the magnet 1 and the partition 12 according to this embodiment of this invention. The drying air 13 thus supplied passes through the space between the lower end of the magnet 1 and the travelling web 11, i.e., under the magnet 1, to dry the magnetic layer formed on the web 11, and is discharged from the back portion of the magnet 1. By the same manner as above, each of the gaps $c_2$, etc. between magnets 2 and 3, etc. may also be divided into a front section and a back section by inserting partitions 16 into each gap, and the drying air may be supplied as above described. For example, the gap $c_2$ between the magnets 2 and 3 is divided by the partition 16 into a front section and back section and drying air 14 is supplied through the section between the partition 12 and the magnet 2 formed in the gap $c_1$ and is discharged through the back section between the magnet 2 and the partition 16 formed in the gap $c_2$ after passing under the magnet 2 to dry the coated magnetic layer on the web 11. Furthermore, drying air 15 may alternately or additionally be supplied through the back section between the magnet 2 and the partition 16 formed in the gap $c_2$ and discharged through the front section between the partition 12 and the magnet 2 formed in the gap $c_1$ after passing under the magnet 2 as indicated by the dotted arrow. The aforesaid mode of supply and passing drying air through the front and back sections in each gap is referred to as "separately passing drying air through the front and back sections in each gap" in this invention.

By employing the foregoing constitution of the magnets with a partition disposed in each gap between the magnets, and by separately passing drying air through a front section and a back section formed in the gap by the partition according to this embodiment of the invention, the magnetic orientation and drying of the coated magnetic layer can be very effectively performed.

The type of magnets employed, the dimensional conditions of the magnets, and the intensity of the magnetic field in this embodiment of this invention are the same as described in connection with the first embodiment.

In addition, when coreless solenoids are employed as the magnets in this embodiment, the space in the solenoid coil is divided by a partition into two sections and drying air may be separately passed through the sections.

Moreover, in both embodiments of this invention as described above, when the travelling passageway of the web in the magnetic field is long, support rolls for the web may be disposed under the travelling web to stably maintain the passage of the web in the magnetic field, and further, if necessary, drying air may be further supplied through each gap between the magnets disposed under the travelling web to assist in the drying of the coated magnetic layer.

The invention will now be further explained with reference to the following examples.

| | |
|---|---|
| Co-Substituted Ba ferrite (platelet-form particles of $0.1\mu$ in mean particle size and $0.03\mu$ in mean thickness, coercive force: 1,320 Oe) | 300 parts |
| Graphite Powder (mean particle size: about $5\mu$) | 15 parts |
| Vinyl chloride-vinylidene chloride copolymer (copolymerization ratio of 80:20, molecular weight of 45,000) | 45 parts |
| Amyl stearate | 10 parts |
| Silicone oil | 4 parts |
| Lecitin | 3 parts |
| Methyl ethyl ketone | 300 parts |
| Toluene | 300 parts |

The foregoing components were mixed in a ball mill to provide a dispersion. Then, 50 parts of polyester polyol was added to the dispersion followed by mixing uniformly, and after further adding thereto 30 parts of polyisocyanate, the resultant mixture was mixed again to provide a hardenable magnetic coating composition.

On the other hand, the foregoing coating composition was coated on a polyethylene terephthalate film of $25\mu$ in thickness treated by corona discharging at a dry thickness of $4\mu$ by means of a gravure roll.

Figure 2:
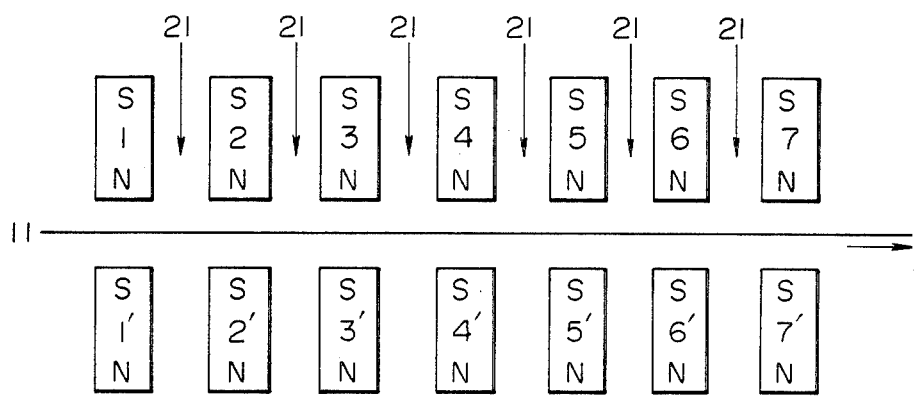
FIG. 2 is a schematic view showing the disposition of the magnets as used in the example regarding the first embodiment of the process of this invention.
Figure 3:
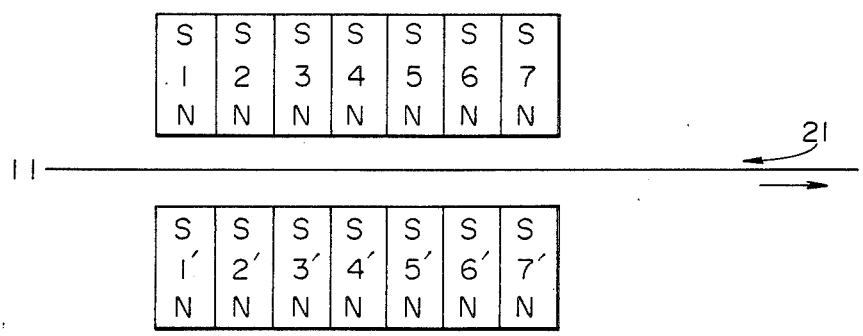
FIG. 3 is a schematic view showing the disposition of the magnets as used in the comparison example regarding the first embodiment of this invention.

The magnetic orientation of the coated magnetic layer was performed under the influence of 20 pairs of opposite pole type permanent magnets 1, 1', 2, 2', ... 20,20' (only 7 pairs are shown in FIG. 2) each having a width of 20 mm in the travelling direction of the web with a gap of 20 mm between the pairs of magnets, as shown in FIG. 2, while supplying drying air 21 at 80°–120° C. through each gap. The intensity of the magnetic field of each pair of magnets was 4,000 gauss. For the sake of comparison, a comparison magnetic orientation process was also performed under the influence of 20 pairs of the same permanent magents (only 7 pairs are shown in FIG. 3) as described above, which were disposed closely to each other, as shown in FIG. 3, while supplying the same amount of drying air 21 as above, from the outlet side of the web 11. The web (film) 11 having the foregoing coated layer in an undried state was continuously passed through the magnetic field while changing the web speed, as shown in the following table, and the degree of orientation (SQ$\perp$) perpendicular to the web surface, the dried state of the coated magnetic layer when the web emerged from the magnet section, and the stability or unstability of the web with respect to vibrations caused by the drying air in each case are shown in the following table.

TABLE 1

| | Dried State | | State of Web | | SQ $\perp$ | |
|---|---|---|---|---|---|---|
| Web Speed | Example 1 | Comparison Example | Example 1 | Comparison Example | Example 1 | Comparison Example |
| 20 m/min. | Dried | Slightly Insufficient | Stable | Vibrated | 0.5 | 0.46 |
| 25 m/min. | Dried | Insufficient | Stable | Vibrated | 0.5 | 0.43 |
| 30 m/min. | Dried | Undried | Stable | Vibrated | 0.5 | 0.39 |
| 35 m/min. | Slightly Insufficient | Undried | Stable | Vibrated | 0.46 | 0.39 |

As is clear from the results shown in the above table, it will be understood that by employing the disposition of plural pairs of magnets for forming a magnetic field and by supplying drying air through each gap between pairs of magnets according to the invention, an effective magnetic orientation perpendicular to the web surface and sufficient drying of the coated magnetic layer are obtained at a higher web speed, and hence a perpendicularly oriented magnetic recording medium can be obtained with higher productivity by the process of this invention.

In the foregoing example, permanent magnets were used, but other magnets such as electromagnets and coreless solenoids can also be used. In addition, a coreless solenoid has a low efficiency with respect to the generation of the magnetic field, but has a merit in that drying air can easily be supplied through the hollow portion of the solenoid.

Also, in this invention, a shearing treatment as disclosed in Japanese Patent Application No. 176,260/1981 can be employed in the disposition of the magnets according to this invention, and in this case, to prevent the occurrence of flapping of a smoothing blanket by the action of the drying air directed to the smoothing blanket portion for giving shear, and the formation of stripes on the surface of the coated layer by drying of the end portion of the smoothing blanket, when the smoothing blanket is disposed under the upper magnet of the first pair of opposite pole type magnets, a baffle plate may be disposed between the upper magnets of the first and the second pairs of magnets or under the second pair of magnets for preventing the drying air from reaching the smoothing blanket.

EXAMPLE 2

This example relates to the second embodiment of this invention.

A hardenable magnetic coating composition having the same formulation as in Example 1 was prepared and coated on a polyethylene terephthalate film of 25μ in thickness subjected to a corona discharging treatment at a dry thickness of 4μ.

Figure 5:
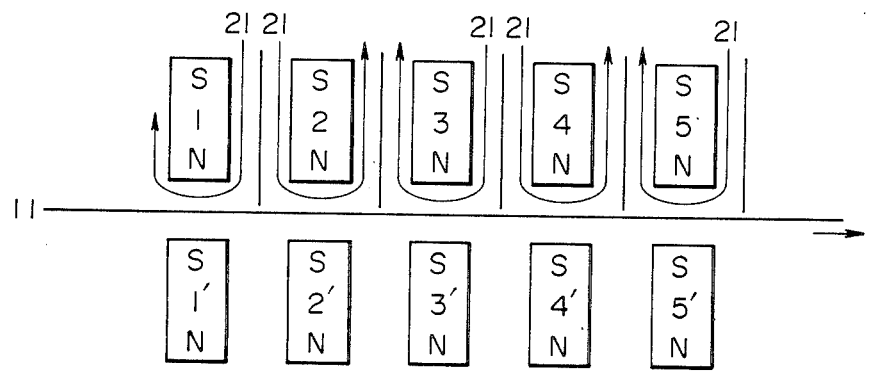
FIG. 5 is a schematic view showing an example of the second embodiment.

The magnetic orientation of the coated layer in an undried state was performed under the influence of 10 pairs of opposite pole type permanent magnets (only 5 pairs are shown in FIG. 5), each having a width of 20 mm, in the travelling direction of the web, with a gap of 20 mm. A partition was inserted in each gap as shown in FIG. 5, and drying air 21 at 80°–120° C. was passed through the front and back sections divided by each partition as indicated by the arrows. The intensity of the magnetic field was 4,000 gauss. For the sake of comparison, the magnetic orientation treatment was also performed with the same disposition of the magnets except that partitions were not employed. Thus, the web (film) 11 having the foregoing coated layer in an undried state was continuously passed through the magnetic field while changing the web speed as shown in Table 2, and the degree of orientation (SQ⊥) perpendicular to the web surface and the dried state of the coated magnetic layer when the web emerged from the magnet section were as shown in Table 2.

TABLE 2

| | Dried State | | SQ ⊥ | |
|---|---|---|---|---|
| Web Speed | Example 2 | Comparison Example | Example 2 | Comparison Example |
| 20 m/min. | Dried | Slightly Insufficient | 0.51 | 0.46 |
| 25 m/min. | Dried | Undried | 0.51 | 0.4 |
| 30 m/min. | Dried | Undried | 0.50 | 0.39 |
| 35 m/min. | Slightly Insufficient | Undried | 0.46 | 0.39 |

As is clear from the results shown in the above table, it will be understood that by employing partitions in each gap for effectively passing the drying air through each space between the lower end of each magnet of the upper surface of the travelling web according to the second embodiment of this invention, high SQ⊥ is obtained at a higher web speed as compared to the comparison example according to the first embodiment of this invention.

In addition, it will be understood that Example 2 is presented to show the superiority of the second embodiment of this invention in comparison with the first embodiment of this invention, but not to imply any inferiority of the first embodiment. As a matter of course, the mode of the first embodiment shown as the comparison example in the above example is superior to the conventional mode of orientation treatment, shown as the comparison example in Example 1.

What is claimed is:

1. A process of producing a magnetic recording medium by drying a web having a magnetic layer containing ferromagnetic particles on a nonmagnetizable support in an undried state while orienting the magnetic layer in a magnetic filed in the direction perpendicular to the web surface, comprising; passing said web through a magnetic filed formed by plural pairs of opposite pole type magnets disposed in the travelling direction of the web with a gap between the pairs of magnets, while supplying drying air through said gaps onto the travelling web, to perform the magnets, while supplying drying air through said gaps onto the travelling web, to perform the magnetic orientation of the magnetic layer and at least substantially complete the drying of the magnetic layer while said web is within said magnetic field, wherein a partition is inserted in each gap between the magnets disposed above the travelling web so that the lower end of the partition lies close to the supper surface of the travelling web, to thereby divide each gap into a front section and a back section, the drying air being separately passed through the front and back sections of each gap.

2. The process of producing a magnetic recording medium as claimed in claim 1, wherein said ferromagnetic particles contained in the magnetic layer are platelet-form ferromagnetic particles having the axis of easy magnetization perpendicular to the plane of the particle.

3. The process of producing a magnetic recording medium as claimed in claim 1, wherein the web is passed through said magnetic field while being supported by support rolls.

* * * * *